Figure 1:
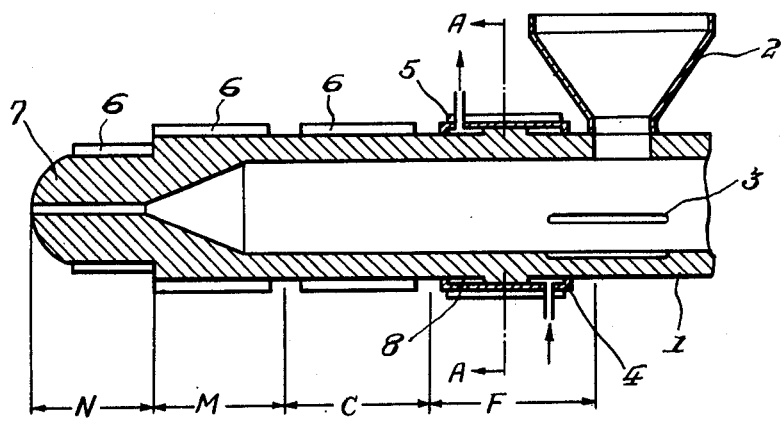

United States Patent [19]

Horikawa et al.

[11] 4,012,478

[45] Mar. 15, 1977

[54] METHOD OF MAKING ANTI-FRICTION MEMBERS FROM LUBRICANT-IMPREGNATED POLYAMIDE SYNTHETIC RESIN MATERIALS

[76] Inventors: Masayuki Horikawa, Oiles Kogyo K.K. Kamataryo 1-28-5 Minami-Rokugo, Kamata, Tokyo; Yataro Takata, 5-402 Nihon Jutaku Kodan Takinoue-Danchi, 120 Takinoue, Naka, Yokohama; Kikuo Sumiyoshi, Oiles Kogyo K.K. Benten Shataku 4-21-15 Sanno, Ohta, Tokyo, all of Japan

[22] Filed: June 4, 1973

[21] Appl. No.: 366,426

Related U.S. Application Data

[63] Continuation-in-part of Ser. No. 36,950, May 13, 1970, abandoned, which is a continuation-in-part of Ser. No. 694,495, Dec. 29, 1967, abandoned.

[52] U.S. Cl. .................... 264/211; 252/12; 260/18 N; 260/67 FP; 260/78 S; 264/176 R; 264/329
[51] Int. Cl.² .............. B29B 1/10; B29B 3/02; B29F 3/02
[58] Field of Search ......... 264/176 R, 329, 211; 260/78 S, 67 FP, 18 N; 252/12

[56] References Cited

UNITED STATES PATENTS

| | | | |
|---|---|---|---|
| 2,246,086 | 6/1941 | Austin | 252/12 X |
| 2,374,069 | 4/1945 | Balthis | 264/211 |
| 2,698,966 | 1/1955 | Stott et al. | 252/12 UX |
| 2,855,377 | 10/1958 | Stott | 252/12 X |
| 3,079,338 | 2/1963 | Caubet | 252/12 |
| 3,146,287 | 8/1964 | Kleine-Albers | 264/329 |
| 3,164,563 | 1/1965 | Maxwell et al. | 260/67 FP UX |
| 3,297,808 | 1/1967 | Pflueger | 264/176 R |
| 3,484,399 | 12/1969 | Kakos | 260/67 FP X |
| 3,679,788 | 7/1972 | Kiyono et al. | 264/211 |
| 3,755,221 | 8/1973 | Hitch | 260/78 S X |

FOREIGN PATENTS OR APPLICATIONS

| | | | |
|---|---|---|---|
| 683,232 | 12/1966 | Belgium | 264/176 R |
| 683,233 | 12/1966 | Belgium | 264/176 R |
| 889,403 | 2/1962 | United Kingdom | 260/18 N |
| 1,102,851 | 2/1968 | United Kingdom | 264/176 R |
| 1,102,852 | 2/1968 | United Kingdom | 264/176 R |

OTHER PUBLICATIONS

"Buyers Guide to Engineering Thermoplastics," In *Plastics Technology*, vol. 12, No. 10, Oct. 1966, pp. 32, 45–54.

Bernhardt; Ernest C., Edt. "Processing of Thermoplastic Materials," New York, Reinhold, c 1959, pp. 154–165.

*Primary Examiner*—Philip Anderson
*Attorney, Agent, or Firm*—Oldham & Oldham Co.

[57] ABSTRACT

This invention relates to self-lubricating bearings or other anti-friction elements formed of a lubricant-containing polyamide. It can be manufactured in various shapes by molding a powdery mixture of the polyamide having a bulk factor of 2 – 5 with 2 – 12 wt % of a lubricant which is in a liquid state at a normal room temperature, are at a temperature between the room temperature and the polyamide melting temperature by the screw type injection or extrusion molding machine having controlled temperatures of the heating cylinders in the feed, the compressions, the metering, and the nozzle sections of the extruder.

11 Claims, 2 Drawing Figures

METHOD OF MAKING ANTI-FRICTION MEMBERS FROM LUBRICANT-IMPREGNATED POLYAMIDE SYNTHETIC RESIN MATERIALS

This is a continuation-in-part of our prior application Ser. No. 36,950 filed May 13, 1970, which was a continuation-in-part of application Ser. No. 649,495 filed Dec. 29, 1967, both now abandoned.

This invention relates to bearings or other antifriction elements formed of a lubricant-contained polyamide and to a method of making such elements. More particularly, this invention relates to providing bearings or other antifriction elements formed of a polyamide containing 2 – 12 wt % of the lubricant which is in the liquid state at the normal room temperature or at the melting point of polyamide, the lubricant being present as a uniform dispersion of finely divided particles separated from each other.

In the specification, the term "the lubricant" means those as mentioned above, while the term "the lubricant contained or containing polyamide" means the polyamide containing the lubricant which is in the liquid state at the normal room temperature or at the melting point of polyamide as a uniform dispersion of finely divided particles separated from each other.

As is well known, polyamide is a polymerization-condensation product of di-carboxylic acid and diamine or a polymerization product of a lactam of amino-carboxylic acid.

Polyamide as well as polyacetal are generally very excellent in low friction and in mechanical strength, namely as wear resistance, creeping resistance, or faique resistance, together with desirable chemical properties, namely resistance to oil and other common organic solvents. This advantageous feature of polyamide in combination with other merits accounts for the fact that the polyamide is widely used as engineering plastics, particularly in the field of bearings, gears, cams, liners and other mechanical elements with need for substantial antifriction or wear-resistance properties.

It has, however, been found by us that, if polyamide is used under relatively severe conditions and in a dry state in a bearing in an industrial machine without any supplement of a lubricant, it will be unable to exhibit satisfactory bearing performances. Although it is possible to overcome the disadvantages as mentioned above by means of a provision of oil supplying means and an application of a lubricant to the bearing material, the use of a self-lubricating bearing material, containing the lubricant therein, is desirable.

An object of this invention is to provide a lubricant-contained polyamide material having superior performance when formed into bearings or other antifriction elements.

Another object of this invention is to provide a lubricant-contained polyamide material suitable for use in bearings or other antifriction elements, which material is highly self-lubricating and has a low coefficient of friction and also is excellent in resistance to wear and in load carrying capacity and also in speed characteristic property.

Another object of the present invention is to provide an efficient method of molding lubricants and polyamides to form a lubricant-contained polyamide material having excellent performances in or as bearings or other antifriction elements.

It has been found that the objects of this invention are accomplished by mixing at a normal room temperature a polyamide powder having a bulk factor of 2 – 5, with 2 to 12 wt % of lubricant which is in the liquid state at the normal room temperature or at the melting point of polyamide, and molding the resulting composition by means of the screw type injection or extrusion molding machine and controlling a temperature thereof to predetermined extents, so that the lubricant may be uniformly disposed in the polymer as finely divided particles separated from each other with the assistance of heat and pressure during molding.

Generally, oil-impregnated porous sintered material lacks a load carrying capacity owing to the difficulty of forming a stable oil film on a sliding surface of the bearings and to avoid exhausting the impregnated oil by wastefully flowing out the lubricant oil from the sliding surface and other portions of the bearings thereby being injured the bearing performances.

There is disclosed in U.S. Pat. No. 3,252,905, a process of manufacturing a lubricant contained polyamide molded article by mixing an appropriate lubricant oil into the polyamide monomer and then polymerizing the monomer, said process seems to be a new process adapting the so-called "Monomer Casting Process" in manufacturing of a lubricant contained polyamide molded article.

However, said process is complicated and not suitable for manufacturing small shaped molded articles and also is poor in mass production of plastic bearings containing the lubricant.

It has been found from various experiments that solid lubricants such as graphite, molybdenum disulfide or lead monomer serve to improve the load carrying capacity but do not serve to improve a self-lubricating property or a speed characteristic property.

In order to manufacture polyamide bearings having good self-lubricating properties, load carrying capacity and speed characteristics property, it is the most essential matter, as confirmed from our experiments, to provide the bearings formed of the polyamide with 2 – 12 wt % of a lubricant which is in the liquid state at the normal room temperature or at the melting point of polyamide.

If less than 2 wt % of the lubricant is contained in the polyamide bearings, the desired self-lubricating property is not displayed and the maximum PV value is remarkably reduced as shown in Table 5.

While if more than 12 wt % of the lubricant is contained in the polyamide bearings, the load-carrying capacity reduces and the moldability of the lubricant contained poyamide powder reduces and voids, and/or deformation as well as flow marks are easy to create in the molded article thereby depressing the worth of the molded article.

It has been provided that the maximum amount of the lubricant to be contained in the polyamide molded article depends on the particle size of the polyamide powder. Namely, the more the particle size of the polyamide powder decreases, the more the amount of the lubricant to be contained in the polyamide molded article will increase.

However, the amount of lubricant to be contained in the polyamide molded article is not completely controlled by the apparent particle size of the polyamide powder by the reason that only a small amount of the lubricant may be contained in the polyamide molded article in spite of using a relatively small apparent particle size is complicated and requires use of a high cost measurement instrument.

The inventors have researched for a suitable method for foreseeing the maximum amount of the lubricant to be contained in the molded articles on the basis of the particle size of the plastic powder prior to molding in case that the lubricant is added to plastics not having any affinity for the lubricant for example polyamide or polyacetal, but differing for plastics having affinity for the lubricant, for example polyethylene.

The density or the apparent density of polyamide powder is seemed to be preferably in order to pre-estimate the amount of lubricant to be contained in the polyamide molded articles.

However, it has been found that polyamide molded articles containing 3wt % of the lubricant may be manufactured by using 6-nylon (specific gravity 1.14) as well as 6.6-nylon (specific gravity 1.14) having the apparent density of 0.5, while that said molded article containing 3 wt % of the lubricant is not able to be manufactured by using 12-nylon (specific gravity 1.02) having the apparent density of 0.5.

On studying said fact, it has been concluded that 6-nylon as well as 6.6-nylon powders having the apparent density of 0.5 shows the bulk factor of 2.3 as calculated from the following formula and while 12-nylon having the apparent density of 0.5 shows the bulk factor 2.0 and also that even if the apparent density of the polyamide is the same, the maximum amounts of the lubricant to be contained in the molded articles will differ from each other.

In view of said matters, the conflict as mentioned above is easily solved by estimating the maximum amount of the lubricant to be contained in the molded article on the basis of the bulk factor of the polyamide powder prior to molding.

It has been concluded that the estimating method according to the bulk factor is the most practical, simple and reliable estimating method independent of the kinds of polyamide used.

The bulk factor is expressed by the following formula wherein $D_1$ represents the apparent density of the polyamide powders prior to molding, $D_2$ represents the inherent density (specific gravity) of polyamide as shown in the Table 4.

$$\text{Bulk Factor} = \frac{D_2}{D_1}$$

The apparent density is measured by ASTMD: D-1895-65T Method A.

Table 1 shows the relationship between bulk factor of the polyamide powder and the amount of the lubricant to be contained in the molded article which may be smoothly molded without separating any lubricant from the polymer.

Table 1

| Bulk Factor | less than 2 | 2 – 3 | 3 – 4 | 4 – 5 |
| --- | --- | --- | --- | --- |
| The maximum amount of the lubricant to be added (wt%) | less than 2 | less than 5 | less than 8 | less than 12 |

If more than 5 wt % of the lubricant, for example 8 wt % thereof is added to the polyamide powder having the bulk factor of 2 – 3, excess parts of over the permitted amount (less than 5 wt %) of the lubricant will be excluded during molding thereby making it impossible to mold due to hinderance by the excluded lubricant. Therefore, it is necessary to add the amounts (less than 5 wt %) of the lubricant corresponding to the range of the bulk factor (2 – 3) in order to smoothly mold.

The bulk factor estimates the amount of the lubricant to be contained in the molded article and also gives the influence to the dispersibility of the lubricant as well as the moldability of the polyamide molding material, namely the more the bulk factor increases, the more the moldability of the polyamide powder and the uniformity as well as the dispersibility of the lubricant contained in the molded article are improved.

Therefore, in case that a polyamide molded article containing 6 wt % of the lubricant is desired to be manufactured, the polyamide powder having the bulk factor of 3–4 may be used, but polyamide powders having the bulk factor of more than 4, namely 4–5 are preferable to use.

It has been found from our experiments that the polyamide powder having the bulk factor of 4–5 is manufactured according to the following process.

To obtain the polyamide powder having a large bulk factor of about 5, for example, the process disclosed in U.S. Pat. No. 2,592,616 specification in which the polyamide is treated with methyl alcohol, is used. The bulk factor can be varied by changing the powder formation and treating conditions.

I. Table 2 shows a relationship between the particle size (mesh) of 6-nylon-powder treated according to the process disclosed in said U.S. Patent specification and the bulk factor.

Table 2

| Tyler Mesh | 20 – 48 | 48 – 65 | 65 – 80 | 80 – 100 | more than 100 |
| --- | --- | --- | --- | --- | --- |
| Bulk Factor (Average) | 4.25 | 4.30 | 4.30 | 4.35 | 4.50 |

Theoretically, polyamide powder having the bulk factor of more than 5 may be manufactured, but the maximum value of the bulk factor has been about 5 until now according to the applicant's experiments.

II. Table 3 shows a relationship between the particle size (mesh) of 6-nylon powder manufactured according to the mechanical process and the bulk factor.

Table 3

| Tyler Mesh | 20 – 48 | 48 – 65 | 65 – 80 | 80 – 100 | more than 100 |
|---|---|---|---|---|---|
| Bulk Factor (Average) | 1.58 | 1.72 | 1.93 | 2.07 | 2.20 |

It hence as been found from Tables 2 and 3 that the value of the bulk factor of polyamide powder depends on the method of treatment even if the particle size belongs to the same particle size distribution fraction.

Polyamides used in this invention are powdery polymers of ⅓-caprolactam, undecano-lactum, lauric-lactam and a polyerization-condensation product of hexamethylene diamine and adipic acid. They are so called 6-nylon, 11-nylon, 12-nylon and 6.6-nylon.

Some of the properties of the polyamide are shown in Table 4.

Table 4

| Property Polymer Units | 6-Nylon | 6.6-Nylon | 11-Nylon | 12-Nylon |
|---|---|---|---|---|
| Melting Point ° C | 215–220 | 255 | 184–185 | 175–177 |
| Specific Gravity | 1.14 | 1.14 | 1.03 | 1.02 |
| Flex. Strength Kg/cm$^2$ | 1.030–1.040 | 960–970 | 480–500 | 580–590 |
| Surface Hardness Rockwell | R 114–117 | R118–120 | R100–102 | R-100–105 |
| AV. Molecular weight | 45.000 | 45.000 | 40.000 | 45.000 |

In this invention, especially 6-nylon as well as 6.6-nylon are superior as bearing materials.

The lubricant to be used in this invention is primarily selected from a mineral oil such as SAE120 cylinder oil and synthetic lubricant oils which are in the liquid state at the normal room temperature and paraffin wax, a higher fatty acid, a higher fatty acid ester, which are in a solid state at the normal room temperature but in the liquid state at the melting point of the polyamide and grease which is in a jelly state at the normal room temperature.

The lubricant used may be a single composition or one lubricant may be mixed with another.

As occasion demands, additives such as lithium stearate, graphite and molybdenum disulfide may also be added to the polyamide powder together with said lubricant. The amount of such additives as graphite and molybdenum disulfide should preferably be limited to less than 5 wt % on the weight basis of the molding composition. The amount of such additive as soaps, particularly lithium stearate may be used together with the lubricant in order to improve the dispersibiliy as well as the retention of the lubricant but the amount of said additive should preferably be limited to less than 3 wt %.

However, many difficulties are encountered in cheaply manufacturing the polyamide bearings containing the lubricant on an industrial scale as compared with the manufacture of bearings containing a solid lubricant such as graphite, since the separate lubricant mixed with the polyamide may not be uniformly mixed or dispersed through the polyamide during an injection or an extrusion molding process whereby a satisfactory molding bearing is not manufactured.

It has been proved from the experimental results that the separation of the lubricant from the polyamide during molding tends to be reduced by use of the fine polyamide powder having the bulk factor of 2 to 5, but the mass production of the molded article remains difficult resulting from a lack of moldability.

In order to improve the moldability sufficiently, melting and kneading the polyamide powder with the lubricant so as to uniformly disperse the lubricant through the polyamide as finely divided particles separated from each other is achieved by use of a screw type injection or extrusion molding machine. But satisfactory results are not yet obtained by reason that the polyamide powder containing 2– 12 wt % of the lubricant slips in the feed section of the heating cylinder of the screw type injection or extrusion molding machine thereby making it difficult to transfer the polyamide powder to the nozzle section of the heating cylinder. Said disadvantages have been removed by cooling the feed section of the heating cylinder by means of an approprirate cooling apparatus.

Table 5 shows the influences of amount of lubricants to be added upon the antifriction performances. In this Table, the lubricant used with the polyamides was SAD No. 120 cylinder oil. Additives used include lithium sterate and graphite and small amounts such as 0.5 or 1.0% by weight of additives may be used.

Table 5

| Specimen No. | Polymer | wt % | Lubricant | wt % | Addities Lithium Stearate | wt % Graphite | Bearing Temp. °C | Bearing Coefficient of Friction | Maximum PV valve kg/cm$^2$·m/min. |
|---|---|---|---|---|---|---|---|---|---|
| 1. | 6-Nylon | 87 | Cylinder oil SAE 120 | 13 | 0 | 0 | 43 | 0.04 | 1,260 |
| 2. |  | 85 |  | 12 | 3 | 0 | 43 | 0.05 | 1,470 |
| 3. |  | 87 |  | 12 | 0 | 0 | 43 | 0.04 | 1,470 |
| 4. |  | 87 |  | 10 | 2 | 1 | 43 | 0.04 | 1,540 |
| 5. |  | 90 |  | 10 | 0 | 0 | 42 | 0.04 | 1,540 |
| 6. |  | 92 |  | 8 | 0 | 0 | 45 | 0.04 | 1,470 |
| 7. |  | 92 |  | 5 | 0.5 | 2.5 | 50 | 0.06 | 1,330 |
| 8. |  | 92 |  | 3 | 0 | 5 | 58 | 0.09 | 1,190 |
| 9. |  | 95 |  | 2 | 3 | 0 | 48 | 0.08 | 1,330 |
| 10. |  | 98 |  | 2 | 0 | 0 | 60 | 0.11 | 1,120 |
| 11. |  | 99 |  | 1 | 0 | 0 | 110 | 0.24 | 350 |
| 12. |  | 100 |  | 0 | 0 | 0 | 125 | 0.30 | 280 |
| 13. | 6-6-Nylon | 88 |  | 12 | 0 | 0 | 45 | 0.05 | 1,470 |

Table 5-continued

| Specimen No. | Polymer | wt % | Lubricant | wt % | Addities Lithium Stearate | wt % Graphite | Bearing Temp. °C | Performance Coefficient of Friction | Maximum PV valve kg/cm²·m/min. |
|---|---|---|---|---|---|---|---|---|---|
| 14. |  | 92 |  | 8 | 0 | 0 | 44 | 0.04 | 1,540 |
| 15. |  | 92 |  | 5 | 0.5 | 2.5 | 50 | 0.06 | 1,330 |
| 16. |  | 92 |  | 3 | 0 | 5 | 60 | 0.10 | 1,260 |
| 17. |  | 98 |  | 2 | 0 | 0 | 60 | 0.12 | 1,120 |
| 18. | 11-Nylon | 88 |  | 12 | 0 | 0 | 45 | 0.05 | 1,330 |
| 19. |  | 92 |  | 8 | 0 | 0 | 43 | 0.04 | 1,470 |
| 20. |  | 92 |  | 5 | 0.5 | 2.5 | 48 | 0.06 | 1,050 |
| 21. |  | 92 |  | 3 | 0 | 5 | 60 | 0.10 | 980 |
| 22. |  | 98 |  | 2 | 0 | 0 | 60 | 0.12 | 840 |
| 23. | 12-Nylon | 88 |  | 12 | 0 | 0 | 46 | 0.04 | 1,260 |
| 24. |  | 92 |  | 8 | 0 | 0 | 43 | 0.04 | 1,330 |
| 25. |  | 92 |  | 5 | 0.5 | 2.5 | 50 | 0.04 | 910 |
| 26. |  | 92 |  | 3 | 0 | 5 | 55 | 0.08 | 840 |
| 27. |  | 98 |  | 2 | 0 | 0 | 60 | 0.10 | 770 |

The tests were conducted on a thrust type friction wear testing machine under conditions including the sliding speed of 14 m/min and the accumulating load pressure of 5 kg/cm² per 5 minutes.

The bearing temperature and the coefficient of friction were measured after the lapse of 60 – 80 minutes from the beginning of test in the condition of the accumulated load pressure of 60 – 80 kg/cm² and the values thereof were shown by an average value except for specimens No. 10, 11 and 26, the values of specimens No. 10, 11 and 26 were tested under the accumulated load pressure of 15 – 20 kg/cm² after the lapse of 15 – 20 minutes from the beginning of the test and the values thereof were shown by the average one.

The maximum PV value was those calculated by the accumulated load pressure at the moment when a specimen polymer begins to melt.

The method of making the bearings or other antifriction members from polyamide according to the present invention will next be described.

Figure 2:
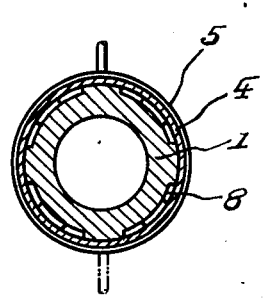

In order to manufacture the molded article of this invention, it is necessary to arrange a specific cooling apparatus in the feed section F of the heating cylinder 1 of the screw type molding machine (the conventional screw being omitted) as shown in FIGS. 1 and 2.

The foregoing and other objects, features and advantages of the present invention will become apparent from the following description when taken in conjunction with the accompanying drawing, in which:

FIG. 1 is a schematic vertical cross section of the heating cylinder of the molding machine designed for use in practicing the method of the present invention; and FIG. 2 is a vertical cross section of the heating cylinder substantially taken along the line A—A of FIG. 1.

Referring to the drawings and particularly to FIG. 2, reference numeral 1 generally indicates the heating cylinder of the screw type molding machine; 2 indicates a hopper for feeding the molding materials; 4 a cooling device; 5 and 6 heaters; and 7 a nozzle. Obviously a driven propelling or feed screw, not shown, is received in the cylinder 1. Reference characters F, C, M and N indicate the feed, compression, metering and nozzle sections, respectively, of the heating cylinder.

The cooling device 4 includes an appropriate enclosed space 8 extending about the periphery of the feed section F of the heating cylinder and pump means (not shown) for circulation of cooling liquid or gas through the space 8. Arranged also about the periphery of the feed section F is heater means 5 which is outside of the cooling device 4 and particularly of space 8. The pump (not shown) and heater means 5 are selectively connected to a common electric power supply source through a changeover switch so that the heater means 5 remains disconnected as long as the pump means is held energized to keep the cooling device in action. Owing to such alternative heating and cooling arrangement, the feed section F of the heating cylinder can be controlled so as to maintain a predetermined relatively low temperature and the whole heating cylinder can be held at a predetermined temperature gradient rising toward the nozzle section N of the cylinder.

The temperatures of the compression, the metering and the nozzle sections of the heating cylinder except that of the feed section in the molding of the polyamide powder containing a lubricant are the same as those for polyamide powder not containing the lubricant.

Table 6 shows the relationship between the temperature of the feed section F of the heating cylinder and the time required to feed the molding material from the feed section to the head or nozzle section of a screw type injection molding machine of 3 ounces capacity, said molding material being prepared by mixing 5 wt % of SAE No. 120 cylinder oil with 95 wt % of 6-nylon having the bulk factor of 4.30.

Table 6

| Temperature ° C in Feed Section (F) | 110 – 160 | 160 – 200 | more than 200 |
|---|---|---|---|
| Time (sec.) required to feed a molding material | 8 – 35 | 35 – 250 | impossible to feed |

Generally speaking, in the screw type injection molding machine of 3 ounces capacity, the heating cylinder of the feed section is 200° C ± 5° C and the time (seconds) required to feed the molding material from the feed section to the head section is preferable to be 10 – 35 seconds in the industrial scale production of the molded article of 6-nylon not containing any lubricant.

As shown in the Table 6, it is necessary to maintain the temperature of the feed section at 110°– 160° C to obtain the time required for feeding the molding material of 8 – 35 seconds to manufacture the bearings or antifriction elements of this invention.

If said temperature is more than 160° C, the molding material of 6-nylon containing the lubricant will not be able to be molded on an industrial scale since a longer time; namely 35 – 250 seconds than that suitable for molding 6-nylon is consumed. While if said temperature is too low, namely less than 110° C, it will be difficult to transfer the molding material from the feed section to the head section of the molding machine thereby consuming much time to transfer and also requiring about 30% excess of power than that necessary to molding the polyamide not containing any lubricant. The temperatures of the compression, metering and nozzle sections of the heating cylinder except that of the feed section in the molding of the polyamide powder containing 2 – 12 wt % of lubricant are the same or less than those of polyamide molding material not containing the lubricant.

Table 7 shows the preferably temperature distribution at various parts of the heating cylinder of said injection or extrusion molding machine.

Table 7

| Temperature, ° C Heating cylinder | Feed Section (F) | Compression Section (C) | Metering Section (M) | Nozzle Section (N) |
|---|---|---|---|---|
| Temperature (° C) in 6-Nylon | 120 ± 3 | 210 ± 3 | 230 ± 3 | 230 ± 3 |
| Temperature (° C) in 6.6-Nylon | 150 ± 3 | 225 ± 3 | 265 ± 3 | 265 ± 3 |
| Temperature (° C) in 11-Nylon | 90 ± 3 | 184 ± 3 | 200 ± 3 | 200 ± 3 |
| Temperature (° C) in 12-Nylon | 80 ± 3 | 175 ± 3 | 190 ± 3 | 190 ± 3 |

It is preferable to use as short a time, for example, 10 – 35 sec., as possible to feed the molding material from the feed section to the head secion of the molding machine, while the molding material of the polyamide containing the lubricant is not able to be molded at a temperature of the feed section of more than 200° C, as shown in Table 6.

Therefore, it is an essential matter to maintain the temperature of the feed section of the heating cylinder to a low temperature and is preferable to have a short feed time, for example, of 8 – 35 sec. as shown in table 6, so as to feed the molding material to the head section smoothly.

It was observed that the time of more than several ten seconds (for example 35 – 250 sec. as shown in Table 6) required to feed the molding material from the feed section to the head section of the molding molding brings not only a lowering of the work efficiency but also a heat deterioration of the material in the heating cylinder. Also the temperature of the heating cylinder in the feed section suitable for a polyamide not containing any lubricant, makes the feed of the molding of the invention impossible.

It is preferable to select the temperature of the heating cylinder in the feed section to that of lower than 75%, especially about 50% of the melting point of the polyamide used and to control the temperature of the heating cylinder in the section except the feed section to about the same temperature or less than the molding temperature of the polyamide not containing the lubricant.

Thus is has been found that the lubricant-contained molded articles suitable for the bearings or other antifriction elements in which the lubricant is uniformly dispersed as finely divided particles separated from each other can be manufactured.

It is to be noted that lubricant-contained molded articles made according to the present invention do not lose their lubricant content even when heated and that during molding, further oil impregnation may be effected in a sintered bearing article but any further oil impregnation can not be effected if tried in the molded articles of the invention since said oil dsperses into the polyamide powder as independent and unlinked oil particles.

Some examples of practicing the present invention will be described.

Example 92 weight % of a polyamide (6-nylon) powder having the bulk factor of 4.3 was mixed with 8 weight % of SAE No. 120 cylinder oil forming a dry loose mixture. From this mixture, tubular oil-contained molded articles were produced by use of a screw type injection molding machine having its heating cylinder temperature controlled to 120° ± 3° C in the feed section, 210° ± 3° C in the compression section, and 230° ± 3° C in the metering and nozzle sections of the cylinder.

The bearing performances of the molded articles are shown in Table 5, Specimen No. 5.

It will be understood that a suitable mold can be connected to the nozzle section of the extrusion machine or that the nozzle 7 can be changed to form a product such as a tube. Such extruded tube can be cut into articles to provide the molded bearing or equivalent production.

While several complete embodiments of the invention have been disclosed herein, it will be appreciated that modification of these particular eembodiments of the invention may be resorted to without departing from the scope of the invention.

What is claimed is:

1. A method of making bearings or other antifriction elements by plasticating a lubricant-contained polyamide comprising polyamide and about 2 – 12 wt. % of a mineral oil lubricant in relation to the total weight of the material uniformly dispersed therein which lubricant is in a liquid state at a normal room temperature, comprising the steps of uniformly mixing at room temperature a polyamide powder having a bulk factor of 2 – 5 so that an increased amount of lubricant may be added, said polyamide selected from the class consisting of nylon-6 having a melting point of from 215° to 220° C and an average molecular weight of about 45,000, nylon 6-6 having a melting point of about 255° C and an average molecular weight of about 45,000, nylon -11 having a melting point of from 184° to 185° C and an average molecular weight of about 40,000 and nylon -12 having a melting point of 175° to 177° C at an average molecular weight of about 45,000, molding the resultant molding composition to article form under heat and pressure by use of a screw type injection or extrusion molding machine, controlling the temperature of the feed section of the machine to that of about 50 – 75 % of the crystalline melting point of the polyamide, the temperature of said feed section of said machine ranges from 80° to 150° plus or minus 3° C, said machine having a compression section, the temperature in said compression section ranging from 175 to 225 plus or minus 3° C, said machine having a metering section, the temperature in said metering section ranging from 192° to 265° plus or minus 3° C, said machine having a nozzle section, the temperature in said nozzle section ranging from 190° to 230° plus or minus 3° C so that an article is provided in which the lubricant oil is uniformly dispersed.

2. A method of making bearings or other antifriction elements as claimed in claim 1 characterized by the step of uniformly mixing a small quantity up to 3 wt % of a soap as an additive, and a small quantity up to 5 wt % of an additive from the group consisting of graphite, and $MoS_2$, and 80 – 98 wt % of the said polyamide powder having a bulk factor of 2 – 5 and containing about 2–12 wt % of lubricant, and molding the resultant composition into an antifriction element.

3. A method as in claim 1 and including the step of selecting the polyamide from the group consisting of polymerization-condensation products of di-carborylic acid and diamine, and a polymerization product of a lactam of amino-carboxylic acid.

4. A method as claimed in claim 1 and including forming the article without any bleeding of the oil from the oil-polyamide mixture.

5. A method as in claim 1 and including the step of using 2 to 5 parts of oil with a polyamide having a bulk factor of 2–3; up to 8 parts of oil with a bulk factor polyamide of 3 – 4; and up to 12 parts of oil with a polyamide having a bulk factor of 4 – 5.

6. A method of making bearings or by plasticating according to claim 1 wherein the mixing time of the material in the feed section is from 8 to 35 seconds.

7. A method of making bearings by plasticating according to claim 1, wherein said polyamide is nylon -6, said feed section temperature is 120° plus or minus 3° C, said compression section temperature is 210° plus or minus 3° C, said metering section temperature is 230° plus or minus 3° C and said nozzle section temperature is 230° plus or minus 3° C.

8. A method of making bearings by plasticating according to claim 1, wherein said polyamide is nylon 6-6, said feed section temperature is 150° plus or minus 3° C, said compression section temperature is 225° plus or minus 3° C, said metering section temperature is 265° plus or minus 3° C and said nozzle temperature is 265° plus or minus 3° C.

9. A method of making bearings by plasticating according to claim 1, wherein said polyamide is nylon -11, said feed section temperature is 90° plus or minus 3° C, said compression section temperature is 184° plus or minus 3° C, said metering section temperature is 200° plus or minus 3° C and said nozzle temperature is 200° plus or minus 3° C.

10. A method of making bearings by plasticating according to claim 1, wherein said polyamide is nylon -12, said feed section temperature is 70° plus or minus 3° C, said compression section temperature is 175° plus or minus 3° C, said metering section temperature is 190° plus or minus 3° C and said nozzle temperature is 190° plus or minus 3° C.

11. A method of making bearings by plasticating according to claim 1, wherein said mineral oil is selected from the class consisting of cylinder oil and synthetic lubricant oil.

* * * * *

UNITED STATES PATENT OFFICE
CERTIFICATE OF CORRECTION

PATENT NO. : 4,012,478
DATED : March 15, 1977
INVENTOR(S) : Masayuki Horikawa et al It is certified that error appears in the above-identified patent and that said Letters Patent are hereby corrected as shown below:

Column 1, line 33, change "faique" to --fatigue--.

Column 2, line 56, change "provided" to --proved--.

Column 3, line 21, change "preferably" to --preferable--.

Column 5, line 14, change "1/3-caprolactum" to -- -caprolactum--.

Column 6, line 50, change "SAD" to --SAE--.

Column 9, line 20, change "preferably" to --preferable--.

Column 9, line 38, change "secion" to --section--.

Column 9, line 52, delete the second use of the word "molding" and insert --machine--.

Column 10, line 10, change "dsperses" to --disperses--.

Address of inventor, Masayuki Horikawa, should be changed from Kamata, Tokyo to -- Ohta-ku, Tokyo --

Signed and Sealed this

Thirty-first Day of May 1977

[SEAL]

Attest:

RUTH C. MASON
*Attesting Officer*

C. MARSHALL DANN
*Commissioner of Patents and Trademarks*